United States Patent
Mueller et al.

(10) Patent No.: US 8,944,109 B2
(45) Date of Patent: Feb. 3, 2015

(54) DIAPHRAGM PRESSURE EXPANSION VESSEL

(75) Inventors: Frank Mueller, Ahlen (DE); Egon Schmitz, Leipzig (DE); Besim Uenal, Ahlen (DE)

(73) Assignee: Winkelmann SP. Z O.O., Legnica (PL)

( * ) Notice: Subject to any disclaimer, the term of this patent is extended or adjusted under 35 U.S.C. 154(b) by 0 days.

(21) Appl. No.: 14/343,447

(22) PCT Filed: Sep. 3, 2012

(86) PCT No.: PCT/EP2012/067052
§ 371 (c)(1),
(2), (4) Date: Mar. 7, 2014

(87) PCT Pub. No.: WO2013/034508
PCT Pub. Date: Mar. 14, 2013

(65) Prior Publication Data
US 2014/0224367 A1    Aug. 14, 2014

(30) Foreign Application Priority Data
Sep. 10, 2011    (DE) .......................... 10 2011 113 028

(51) Int. Cl.
*F16L 55/04*    (2006.01)
*F16L 55/053*    (2006.01)
(Continued)

(52) U.S. Cl.
CPC ............. *F16L 55/053* (2013.01); *F24D 3/1016* (2013.01); *F16L 55/0338* (2013.01)
USPC ................. 138/30; 138/26; 220/720

(58) Field of Classification Search
CPC ........ F04B 37/12; F04B 53/16; F04B 53/004; F16L 55/04; F16L 55/0338
USPC ............... 138/26, 30; 417/540, 542; 123/540; 220/720, 724
See application file for complete search history.

(56) References Cited

U.S. PATENT DOCUMENTS 381,731 A * 4/1888 Walker .......................... 138/30
2,968,319 A * 1/1961 Ball ............................... 138/30

(Continued)

FOREIGN PATENT DOCUMENTS

DE    28 14 162 A1    6/1979
DE    295 17 530 U1   2/1996

(Continued)

OTHER PUBLICATIONS

International Search Report of PCT/EP2012/067052, mailed Aug. 8, 2013.

*Primary Examiner* — Patrick F Brinson
(74) *Attorney, Agent, or Firm* — Collard & Roe, P.C.

(57) ABSTRACT

A diaphragm pressure expansion vessel (1) which is intended to be connected to a line system having two vessel parts (2, 3) which are connected to one another in a pressure-tight and fluid-tight manner in a peripheral connecting region (4), wherein the closed vessel interior (10) which is formed by the two vessel parts (2, 3) is separated into a water chamber (6) and a gas chamber by a diaphragm (5), wherein the water chamber (6) can be connected to the line system via a connection piece (7), wherein the diaphragm (5) is formed from an at least single-layered plastic and is in the form of a bubble, should be developed further such that the risk of fracture of the plastic diaphragm when subjected to loading during replacement is considerably reduced. This is achieved in that the gas chamber is formed by the diaphragm interior (9) and by the vessel interior (10) between that side of the diaphragm (5) which is averted from the water chamber (6) and the adjoining vessel part, wherein that side of the diaphragm (5) which is averted from the water chamber (6) is provided with perforations.

7 Claims, 1 Drawing Sheet

Figure 1:
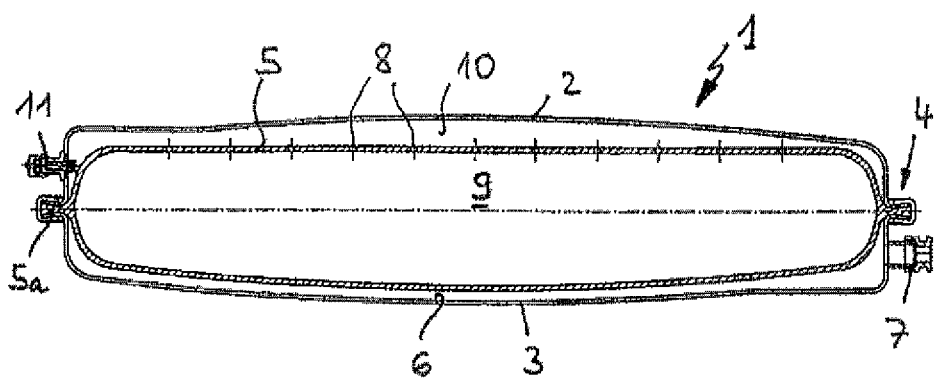

(51) Int. Cl.
*F24D 3/10* (2006.01)
*F16L 55/033* (2006.01)

(56) References Cited

U.S. PATENT DOCUMENTS

| | | | | | |
|---|---|---|---|---|---|
| 3,536,102 | A | * | 10/1970 | Abduz et al. | 138/30 |
| 4,209,041 | A | * | 6/1980 | Loukonen | 138/30 |
| 4,305,428 | A | * | 12/1981 | Burton | 138/30 |
| 4,836,168 | A | * | 6/1989 | Polster et al. | 123/41.5 |
| 2005/0139277 | A1 | * | 6/2005 | Baltes | 138/30 |

FOREIGN PATENT DOCUMENTS

| | | |
|---|---|---|
| EP | 2 175 205 A1 | 4/2010 |
| FR | 2 412 789 A1 | 7/1979 |
| GB | 1 200 515 A | 7/1970 |

* cited by examiner

DIAPHRAGM PRESSURE EXPANSION VESSEL

CROSS REFERENCE TO RELATED APPLICATIONS

This application is the National Stage of PCT/EP2012/067052 filed on Sep. 3, 2012, which claims priority under 35 U.S.C. §119 of German Application No. 10 2011 113 028.8 filed on Sep. 10, 2011, the disclosure of which is incorporated by reference. The international application under PCT article 21(2) was not published in English.

The invention relates to a diaphragm pressure expansion vessel for connecting to a piping network, comprising two vessel parts which are connected to each other in a circumferential connecting region in a pressure-tight and fluid-tight manner, wherein the closed vessel interior which is formed by the two vessel parts is separated by a diaphragm into a water chamber and a gas chamber, wherein the water chamber is connectable via a connecting pipe to the piping network, wherein the diaphragm is formed from an at least single-layered plastic and is of bubble-shaped design.

Such expansion vessels with diaphragms serve to absorb changes in volume occurring, for example, because of pressure-dependent switching of pumps off and on, because of water hammer dampers or else due to temperature in closed liquid circuits, such as in heating circuits or water supply systems.

A differentiation is essentially made between two different expansion vessel types, namely vessels having two vessel parts and a flat diaphragm or diaphragm in the shape of a half shell, and vessels having a bubble-shaped diaphragm which is inserted by the opening edge thereof into the water connecting pipe of the expansion vessel and forms the water chamber. Alternatively, the diaphragm can also form the gas chamber.

In expansion vessels having a flat diaphragm or diaphragm in the shape of a half shell, there are different vessel shapes, wherein a differentiation is made primarily between flat vessels, which are used, for example, in wall-mounted water heaters, and cylindrical or sphere-like vessels. A common feature of said two vessel types is that the vessel interior is divided by a flat diaphragm or diaphragm in the shape of a half shell and preferably consisting of an elastomer, into a water chamber and a gas chamber, wherein the diaphragm can serve at the same time as a sealing element between the two vessel parts. Such a solution is illustrated, for example, in DE-A 28 14 162. Of substantial disadvantage in the case of said expansion vessels which have long been established is especially that, when diaphragms consist of an elastomeric material, a certain permeation effect cannot be avoided, in particular over a long period of time, and therefore gas from the gas chamber can penetrate the water chamber and therefore the piping network, which is undesirable in particular in the case of heating circuits. This also causes a reduction in the gas volume in the gas chamber, making maintenance necessary since topping up is required. This is associated with a corresponding outlay. A further disadvantage is that diaphragms consisting of elastomers are relatively expensive.

EP 2 175 205 A1 discloses an expansion vessel of the type in question, in which, rather than the diaphragm consisting of an elastomer, use is made of a diaphragm consisting of an at least single-layered, flexible, gas-permeable plastic.

In practice, it has turned out that, in the case of a plastics diaphragm of this type, in particular in the event of use in a flat vessel especially of rectangular design, there is a risk of fracturing due to the alternating loading, in particular in the corner regions, and therefore, especially for such vessel types, a plastics diaphragm has not previously been able to be used with satisfactory success.

It is the object of the invention to develop a diaphragm pressure expansion vessel of the type in question in such a manner that the risk of fracturing for the plastics diaphragm in the event of alternating loading is significantly reduced.

According to the invention, this object is achieved in the case of a diaphragm pressure expansion vessel of the type referred to at the beginning in that the gas chamber is formed by the diaphragm interior and by the vessel interior between that side of the diaphragm which faces away from the water chamber and the adjacent vessel part, wherein that side of the diaphragm which faces away from the water chamber is provided with perforations.

Owing to this configuration, it is possible to, as it were, support the heavily loaded diaphragm side and to relieve the latter of load and thereby to obtain greater stability. For this purpose, the bubble-shaped diaphragm is perforated on the gas side, and therefore the gas chamber consists both of the chamber contents between the corresponding vessel part and the diaphragm, and of the chamber contents of the bubble-shaped diaphragm. The bubble-shaped diaphragm is accordingly installed in the diaphragm pressure expansion vessel in the same way as is otherwise the case with flat diaphragms and said diaphragm is additionally provided with perforations on the gas side. It has turned out that, as a result, the diaphragm side at which the water pressure prevails can be supported on the rear diaphragm side; a buffer effect clearly occurs in the bubble-shaped diaphragm which cushions the alternating loading of the diaphragm and significantly reduces or even precludes the risk of fracturing.

Provision is preferably made here for the diaphragm to be integrated in the circumferential connecting region between the two vessel parts in a gas-tight manner. For this purpose, a sealing element which can be formed by an encircling sealing edge of the diaphragm is preferably provided in the circumferential connecting region. With an appropriate configuration of the circumferential diaphragm edge, the diaphragm itself can therefore serve as sealing element between the two vessel parts. Of course, this does not preclude an additional seal between the vessel parts, and the diaphragm also does not have to be clamped directly between the two vessel parts; rather, it can also be fastened so as to encircle one vessel part only in a gas-tight manner.

Furthermore, provision is preferably made for that side of the diaphragm which faces the water chamber to have a contour which is matched to the contour of the vessel part bounding the water chamber. In the rest state, the diaphragm then bears against the inner wall of the vessel part bounding the water chamber; the volume of the water chamber is therefore negligible and there is virtually no dead space zone, and the full interior volume of the expansion vessel is filled up by the gas chamber, which is filled with a gas which is under a predetermined positive pressure.

The configuration according to the invention of the diaphragm pressure expansion vessel is advantageous in particular when the vessel is designed in a manner known per se as a flat vessel, preferably as a rectangular flat vessel. Such vessels are used in particular in wall-mounted water heaters.

Figure 2:
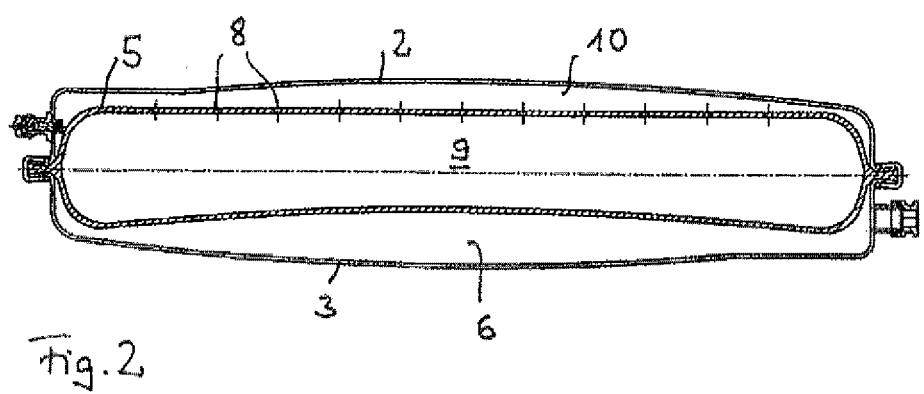

The invention is explained in more detail below by way of example with reference to the drawing, in which, in each case in section:

FIG. 1 shows a diaphragm pressure expansion vessel with a completely expanded diaphragm, and FIG. 2 shows the diaphragm pressure expansion vessel according to FIG. 1 with a frame partially placed over the latter.

A diaphragm pressure expansion vessel is denoted in general by 1. In the exemplary embodiment, said diaphragm pressure expansion vessel 1 is preferably designed as a rectangular flat vessel and is suitable, for example, for insertion into a wall-mounted water heater. However, said vessel can also have a different geometrical configuration (for example, round, cylindrical, spherical) when said vessel is used, for example, in conjunction with a heating boiler.

The diaphragm pressure expansion vessel 1 has two vessel parts 2, 3 which are in the shape of a half shell and are preferably composed of metal. Said two vessel parts 2, 3 are connected to each other in a gas-tight manner in a circumferential connecting region denoted by 4.

The vessel interior contains a bubble-shaped diaphragm 5 consisting of plastic, for example of polypropylene, which can optionally be provided with an EVOH coating and which is integrated so as to encircle the circumferential connecting region 4 between the two vessels parts 2, 3 in a gas-tight manner. For this purpose, the diaphragm in the exemplary embodiment has a single-piece encircling sealing edge 5a. Alternatively, for example, an additional annular sealing element can also be provided.

The diaphragm 5 separates the interior of the diaphragm pressure expansion vessel 1 into a water chamber 6 and a gas chamber, which is described in detail below, wherein the water chamber 6 is connectable via a connecting pipe 7 to a piping network (not illustrated).

It is then essential for that side of the diaphragm 5 which faces away from the water chamber 6 to be provided with perforations 8. By means of said perforations 8, the diaphragm interior, denoted by 9, and the vessel interior 10, which is formed between the adjacent vessel part 2 and that side of the diaphragm 5 which faces away from the water chamber 6, are connected to each other, wherein both the diaphragm interior 9 and the vessel interior 10 are filled with a gas, for example nitrogen, via a gas filling valve 11, i.e. the gas chamber of the diaphragm pressure expansion vessel is formed by the diaphragm interior 9 and the vessel interior 10.

As is best seen from FIG. 1, that side of the diaphragm 5 which faces the water chamber 6 is matched to the contour of the vessel part bounding the water chamber 6. If then, from the inoperative state according to FIG. 1, water enters the water chamber 6 from the piping network through the water connecting pipe 7 (FIG. 2), the diaphragm turns to the inside more or less easily on the side facing the water chamber 6, said turning operation is buffered by the gas volume and the diaphragm is supported, as it were, on the rear side thereof. As a result, the risk of fracturing which otherwise exists in the case of plastics diaphragms, in particular in the corner regions, is substantially reduced or even completely avoided.

LIST OF REFERENCE NUMBERS

1 Diaphragm pressure expansion vessel
2, 3 Vessel parts in the shape of a half shell
4 Circumferential connecting region
5 Diaphragm
5a Sealing edge of the diaphragm
6 Water chamber
7 Connecting pipe
8 Perforations
9 Diaphragm interior
10 Vessel interior
11 Gas filling valve

The invention claimed is:

1. A diaphragm pressure expansion vessel (1) for connection to a piping network, comprising two vessel parts (2, 3) which are connected to each other in a circumferential connecting region (4) in a pressure-tight and fluid-tight manner, wherein the closed vessel interior (10) which is formed by the two vessel parts (2, 3) is separated by a diaphragm (5) into a water chamber (6) and a gas chamber, wherein the water chamber (6) is connectable via a connecting pipe (7) to the piping network, wherein the diaphragm (5) is formed from an at least single-layered plastic and is of bubble-shaped design, wherein the gas chamber is formed by the diaphragm interior (9) and by the vessel interior (10) between that side of the diaphragm (5) which faces away from the water chamber (6) and the adjacent vessel part (2), wherein that side of the diaphragm (5) which faces away from the water chamber (6) is provided with perforations (8).

2. The diaphragm pressure expansion vessel as claimed in claim 1, wherein the diaphragm (5) is integrated in the circumferential connecting region (4) between the two vessel parts (2, 3) in a gas-tight manner.

3. The diaphragm pressure expansion vessel as claimed in claim 2, wherein a sealing element (5a) is provided in the circumferential connecting region (4).

4. The diaphragm pressure expansion vessel as claimed in claim 3, wherein the sealing element is formed by an encircling sealing edge (5a) of the diaphragm (5).

5. The diaphragm pressure expansion vessel as claimed in claim 1, wherein that side of the diaphragm (5) which faces the water chamber (6) has a contour which is matched to the contour of the vessel part (3) bounding the water chamber (6).

6. The diaphragm pressure expansion vessel as claimed in claim 1, wherein said vessel is designed as a flat vessel.

7. The diaphragm pressure expansion vessel as claimed in claim 6, wherein said vessel is of rectangular design.

* * * * *